United States Patent [19]

Ikedo et al.

[11] Patent Number: 5,619,101

[45] Date of Patent: Apr. 8, 1997

[54] GAS DISCHARGE TUBE

[75] Inventors: Tomoyuki Ikedo; Yoshinobu Ito; Ryotaro Matui, all of Hamamatsu, Japan

[73] Assignee: Hamamatsu Photonics K.K., Hamamatsu, Japan

[21] Appl. No.: 552,111

[22] Filed: Nov. 2, 1995

[30]     Foreign Application Priority Data

Feb. 17, 1995 [JP] Japan .................................. 7-029564

[51] Int. Cl.[6] ................. H01J 17/02; H01J 1/88
[52] U.S. Cl. ................. 313/581; 313/631; 313/613; 313/588; 313/243; 313/292
[58] Field of Search ..................... 313/243, 292, 313/567, 581, 588, 589, 591, 613, 629, 631, 632, 637, 614

[56]            References Cited

U.S. PATENT DOCUMENTS 5,057,742 10/1991 Kawai et al. ......................... 313/292
5,191,260 3/1993 Kawai et al. ......................... 313/613
5,552,669 9/1996 Ikedo et al. ......................... 313/589

FOREIGN PATENT DOCUMENTS

4-255662 9/1992 Japan .

Primary Examiner—Sandra L. O'Shea
Assistant Examiner—Jay M. Patidar
Attorney, Agent, or Firm—Cushman Darby & Cushman, IP Group of Pillsbury Madison & Sutro, LLP

[57]            ABSTRACT

A gas discharge tube includes an envelope for sealing a gas, lead pins and a light-emitting assembly. The light-emitting assembly includes: a focusing electrode support member of a conductive material; a hot cathode for emitting thermoelectrons; an anode for receiving thermoelectrons; a focusing electrode for converging paths of thermoelectrons; a spacer of an insulator being arranged between the focusing electrode support member and the anode; and an anode support member of an insulator for pushing the anode onto the focusing electrode support member through the spacer. A gas discharge tube having a long service life and capable of improving the operational stability during long-time continuous light emission can be provided.

22 Claims, 10 Drawing Sheets

GAS DISCHARGE TUBE

BACKGROUND OF THE INVENTION

1. Field of the Invention

The present invention relates to a gas discharge tube used as an ultraviolet light source for a spectrophotometer, liquid chromatography, or the like.

2. Related Background Art

A gas discharge tube is a discharge light source using positive column light emission by arc discharge of a gas sealed in a tube. As a typical gas discharge tube, a deuterium discharge tube in which ultraviolet light is emitted by discharge of sealed deuterium is known. This deuterium discharge tube is mainly used as an ultraviolet continuous spectrum source for a spectrophotometer or the like. Note that such a deuterium discharge tube is described in, e.g., Japanese Patent Application Laid-Open Gazette No. 4-255662.

SUMMARY OF THE INVENTION

In such a gas discharge tube, since very small variations of, e.g., 0.01% or 0.001% in output is undesirable during long-time continuous light emission, strict characteristics are requested in many cases. Further, it is necessary to maintain the electrical insulating property between the focusing electrode and anode of the gas discharge tube during long-time continuous light emission.

It is an object of the present invention to provide a gas discharge tube which has a longer service life than the conventional gas discharge tube and is capable of improving the operational stability during long-time continuous light emission. It is further object of the present invention to provide a gas discharge tube which enables to fully prevent a short circuit between the focusing electrode and the anode of the discharge tube.

A gas discharge tube of the present invention comprises:

an envelope (vessel) for sealing a gas such as deuterium therein;

lead pins introduced into an inner space of the envelope from external of the envelope; and a light-emitting assembly (light-emitting section) positioned at distal ends of the lead pins and supported by the lead pins while spaced from an inner side wall of the envelope, the light-emitting assembly including:

a focusing electrode support member of a conductive material such as a metal, the focusing electrode support member having a front surface and a rear surface which is opposite to the front surface and which is communicated with the front surface by a through hole;

a hot cathode for emitting thermoelectrons, the hot cathode being located at the front surface side of the focusing electrode support member, and being connected to and supported by at least one of the lead pins;

an anode for receiving the thermoelectrons emitted from the hot cathode, the anode being located at the rear surface side of the focusing electrode support member, facing an opening of the through hole, and being connected to and supported by another one of the lead pins;

a focusing electrode being supported by the focusing electrode support member, the focusing electrode having a focusing opening which is located at a position of an opening of the through hole for converging paths of the thermoelectrons, and being connected to and supported by still another one of the lead pins;

a spacer of an insulator such as a ceramic, the spacer being arranged between the focusing electrode support member and the anode, and being in contact with both the rear surface of the focusing electrode support member and a front surface of the anode; and an anode support member of an insulator such as a ceramic, the anode support member being located on an opposite side to the focusing electrode support member through the anode, and having a surface which is in contact with a rear surface of the anode for pushing the anode onto the rear surface of the focusing electrode support member through the spacer, whereby an interval between the focusing electrode and the anode is defined by the focusing electrode support member and the spacer.

The anode support member will have a depression at it's surface which faces to the focusing electrode support member, for accommodating the anode and the spacer, the depression extending from the surface of the anode support member to a vertical direction with respect to the rear surface of the focusing electrode support member.

Further, the gas discharge tube will comprise:

a discharge straightening plate for discharge shielding, the discharge straightening plate being positioned and mounted on the front surface of the focusing electrode support member, and having a slit for passing through thermoelectrons emitted from the hot cathode; and a front cover for discharge shielding, the front cover being positioned and mounted on the front surface of the focusing electrode support member so as to accommodate the hot cathode and the discharge straightening plate in a space defined by the front cover and the focusing electrode support member, the front cover having a window located at a position which faces to the focusing opening of the focusing electrode, for outputting light caused by discharge.

In the gas discharge tube of the present invention, the interval between the focusing electrode and the anode is defined by a surface of the spacer, the rear surface of the focusing electrode support member and an inner wall surface of the focusing electrode support member, the inner wall surface defining the through hole.

The anode support member and the spacer according to the present invention are preferably made of a ceramic, and the focusing electrode support member and the focusing electrode are preferably made of a metal.

In such a gas discharge tube, when arc discharge occurs among the hot cathode, the focusing electrode and the anode, the anode generates heat upon reception of thermoelectrons, and the focusing electrode also generates heat upon bombardment of cations. However, in the gas discharge tube of the present invention, the anode is pressed against and fixed to the anode support member by the focusing electrode support member through the spacer, and the focusing electrode is supported on the front surface of the focusing electrode support member. For this reason, a predetermined interval between the focusing electrode and the anode can be strictly defined by the focusing electrode support member and the spacer.

Therefore, even when the focusing electrode and the anode are heated during use of the gas discharge tube as mentioned above, the predetermined distance between the focusing electrode and the anode can be maintained constant thereby to prevent deformation of the path of the thermoelectrons between the focusing electrode and the anode. Thus the arc discharge state can be held stable, and the stability of light emission of the discharge tube will not be impaired. Additionally, it is achieved by the present invention to prevent shortening of the service life of the discharge tube, such shortening would being caused by an increase in loss of the anode, and the like.

Further, in the gas discharge tube of the present invention, although the focusing electrode support member is conductive, the anode support member and the spacer have electrical insulating properties. For this reason, the conductive anode can be electrically insulated from the conductive focusing electrode as well as the conductive focusing electrode support member by the spacer and the anode support member which have electrical insulating properties.

Furthermore, since the focusing electrode support member according to the present invention is made of a conductive material such as a metal, the focusing electrode can be fixed to the focusing electrode support member by welding. In a case where the discharge straightening plate and the front cover are made of a conductive material, these members can also be fixed to the focusing electrode support member by welding. Therefore, the gas discharge tube of the present invention is easy in production.

The anode according to the present invention preferably comprises:

- an anode fixing plate of a conductive material, the anode fixing plate having a front surface being in contact with the spacer, and a rear surface being in contact with the anode support member; and
- an anode plate for receiving the thermoelectrons, the anode plate being made of a high melting point metal such as molybdenum, and being fixed on the front surface of the anode fixing plate.

In this anode comprising the anode plate and the anode fixing plate, it is preferable that a part of the front surface of the anode fixing plate is not covered with the anode plate for being in contact with the spacer, and the anode plate is not in contact with the spacer to form a space defined by a surface of the spacer, a front surface of the anode fixing plate and a surface of the anode plate.

Further, the spacer according to the present invention preferably has a shape which enables to form a depression defined by a surface of the spacer and the rear surface of the focusing electrode support member and a depression defined by the surface of the spacer and the front surface of the anode.

Specifically, it is preferable that the spacer has a columnar shape, a prismatic shape such as a hexagonal or octagonal one, a spherical shape, or a block-like shape.

Into such a depression defined by the surfaces of the spacer and the focusing electrode support member and such a depression defined by the surfaces of the spacer and the anode, an electrode material which would be sputtered from the anode and/or the focusing electrode by thermoelectrons during light emission of the gas discharge tube is hardly deposited. Particularly, such an electrode material is hardly deposited into a space defined by a surfaces of the spacer, the anode fixing plate and the anode plate.

Therefore, in the gas discharge tube of the present invention, a short circuit between the focusing electrode and the anode can be fully prevented. Further, since the above relatively complex structure for preventing the deposition of the material sputtered is formed by the spacer and the focusing electrode support member both of which have relatively simple structures, it is achieved by the present invention to provide the gas discharge tube not only enabling to prevent the short circuit but also being easy in production.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DETAILED DESCRIPTION OF THE PREFERRED EMBODIMENTS

The arrangement and function of a gas discharge tube according to the first embodiment of the present invention will be described below in detail with reference to FIGS. 1 to 6. The gas discharge tube of this embodiment is a side-on type deuterium discharge tube which emits light (ultraviolet light) from the side portion of the tube. Note that, in this embodiment, the front and rear sides are defined on the basis of the light emission direction.

Figure 1:
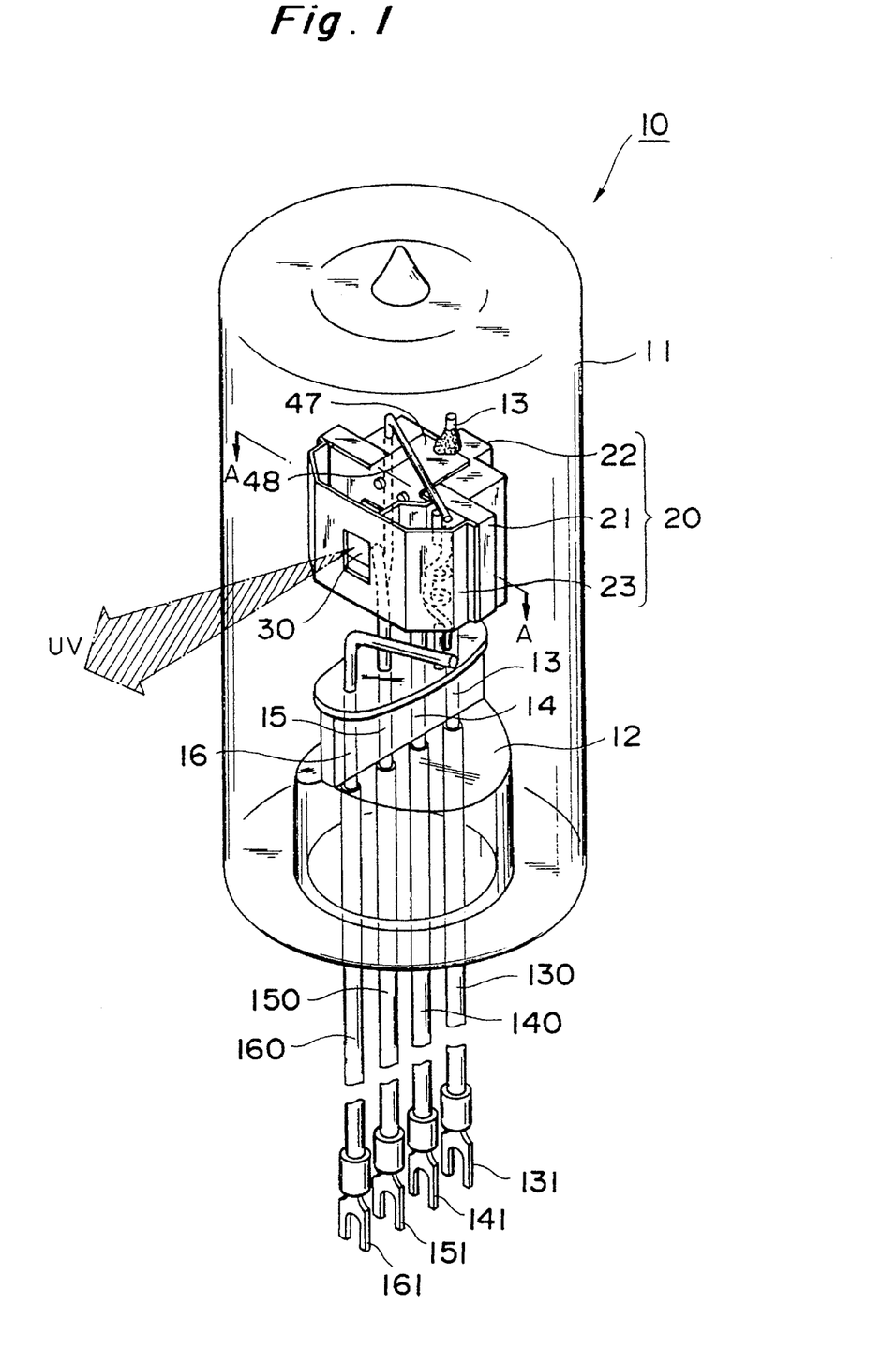
FIG. 1 is a perspective view showing an embodiment (first embodiment) of a side-on type gas discharge tube according to the present invention.

In a deuterium discharge tube 10 shown in FIG. 1, a light-emitting assembly (light-emitting section) 20 is accommodated in a cylindrical glass envelope 11 while being supported by lead pins 13 to 16. Deuterium gas is sealed in the glass envelope 11 at about several Torr. The envelop 11 with its head portion sealed has a cylindrical shape, and the bottom portion of the envelope 11 is hermetically sealed by a glass stem 12. The envelop 11 is made of ultraviolet light-transmitting glass, quartz glass or the like which has a high permeability to ultraviolet light.

The four lead pins 13 to 16 which are in parallel aligned in line extend through the glass stem 12 from the exterior of the envelope 11, and are covered by insulating members 130, 140, 150, and 160, respectively. Terminals 131, 141, 151, and 161 will be connected to terminals of an external power supply. The light-emitting assembly 20 is positioned at distal ends of the lead pins 13–16 and is spaced from an inner side wall of the envelope 11. The light-emitting assembly 20 comprises a front cover 23 which is made of a metal such as Ni or SUS, or a ceramic; an anode support member 22 which is made of a ceramic; and a focusing electrode support member 21 arranged between the anode support member 22 and the front cover 23 and made of a metal (Ni or SUS).

Figure 2:
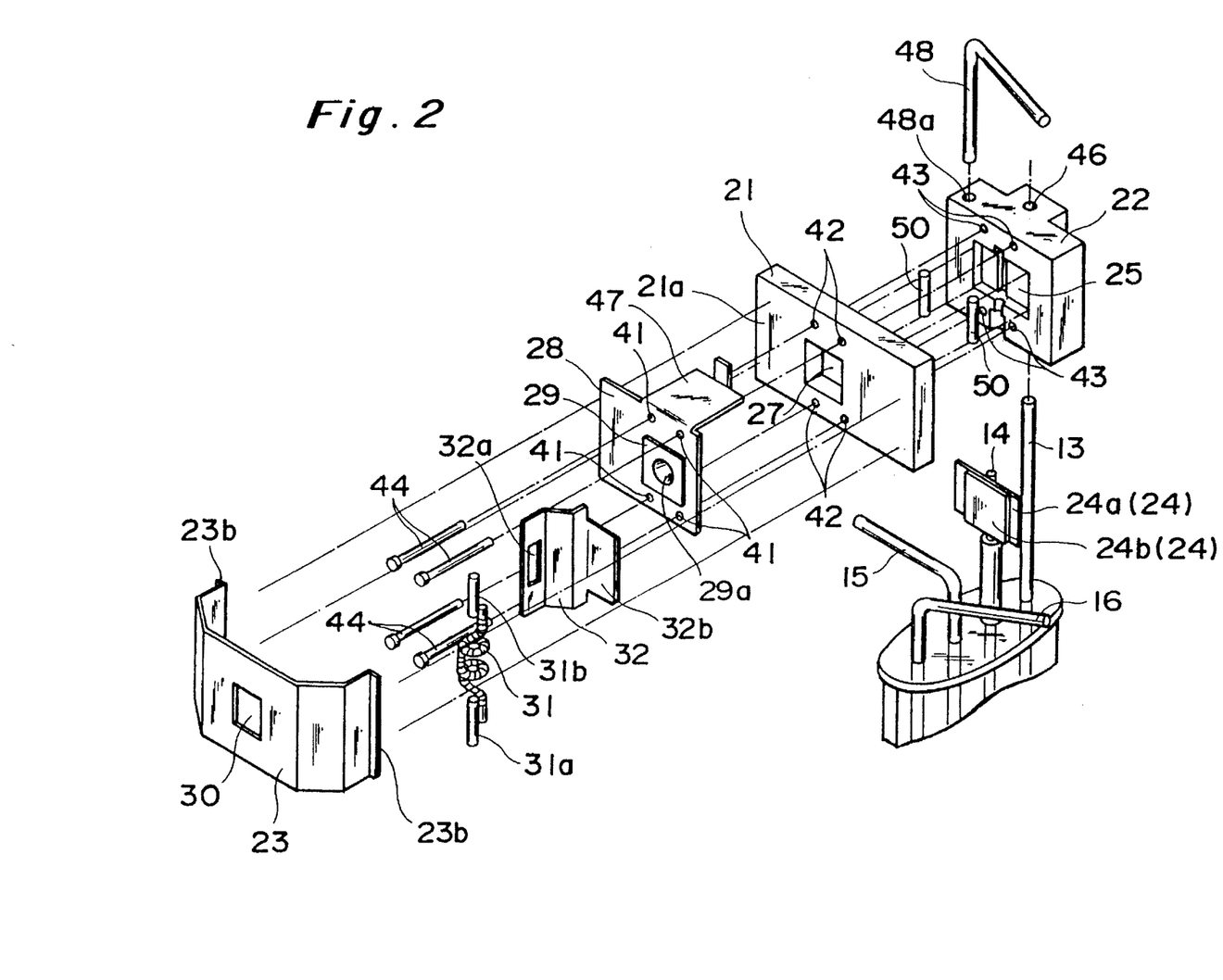
FIG. 2 is an exploded perspective view of a light-emitting assembly of the gas discharge tube shown in FIG. 1.

Specifically, the light-emitting assembly 20, as shown in FIG. 2, comprises: a hot cathode 31 for emitting thermoelectrons; an anode 24 for receiving the thermoelectrons emitted from the hot cathode 31; a focusing electrode 29 having a focusing opening 29a for converging and passing through the thermoelectrons; a focusing electrode support member (discharge shielding member) 21 for supporting the focusing electrode 29; two columnar spacers 50 made of a ceramic and located between the focusing electrode support member 21 and the anode 24; and an anode support member 22 located on an opposite side to the focusing electrode support member 21 through the anode 24 in order to push the anode 24 onto the focusing electrode support member 21 through the spacers 50. The light-emitting assembly 20 further comprises: a discharge straightening plate 32 mounted on the front surface 21a of the focusing electrode support member 21 and having a slit 32a for passing through the thermoelectrons emitted from the hot cathode 31; and a front cover 23 mounted on the front surface 21a of the focusing electrode support member 21 and having a window 30 for outputting ultraviolet light (UV) caused by arc discharge.

The structure of the light-emitting assembly 20 will be described below in detail.

Figure 3:
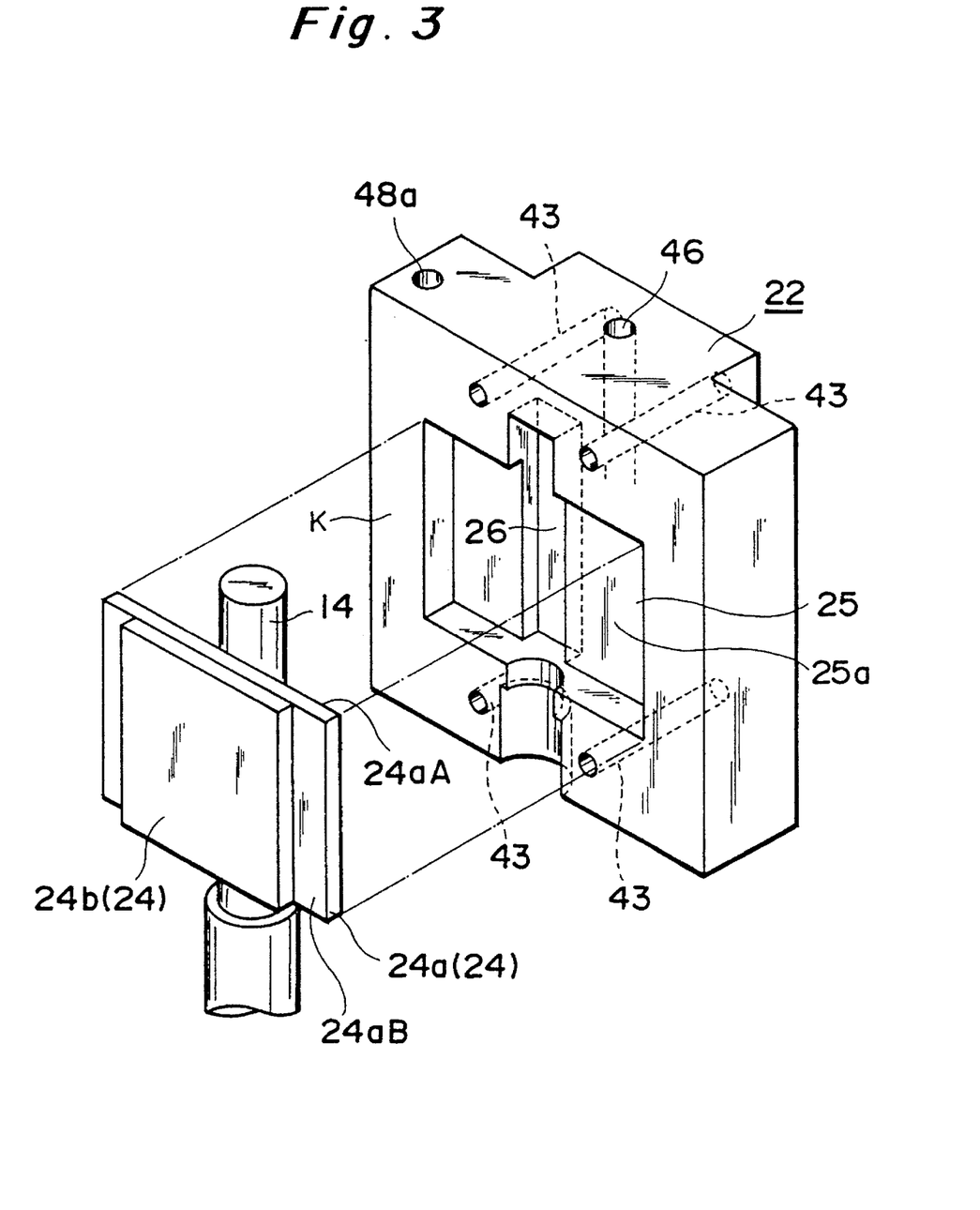
FIG. 3 is a perspective view showing a focusing electrode support member and an anode in the light-emitting assembly shown in FIG. 2.
Figure 5:
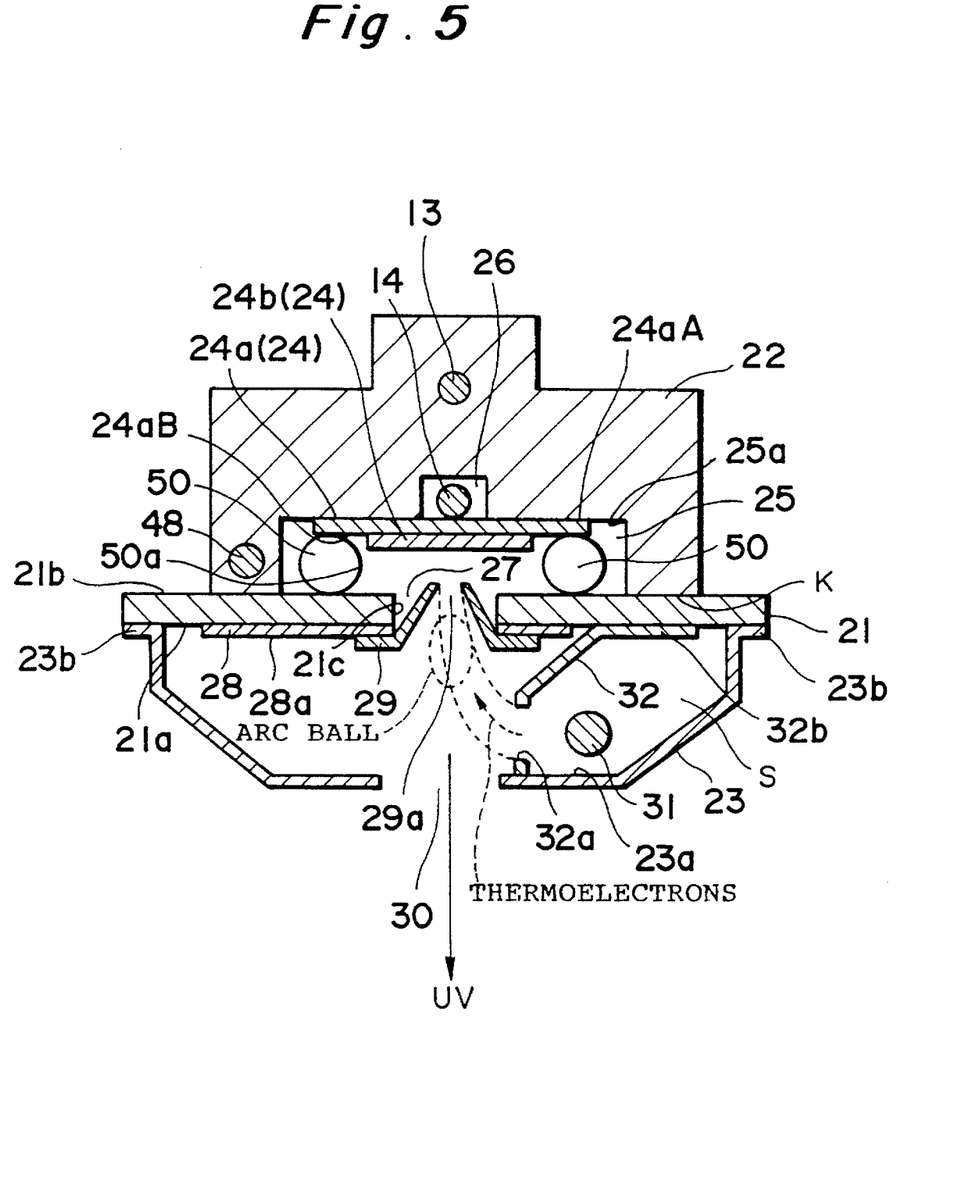
FIG. 5 is a horizontal sectional view of the light-emitting assembly of the gas discharge tube shown in FIG. 1 (taken along a line A—A in FIG. 1).

As shown in FIGS. 2, 3 and 5, an anode (anode portion) 24 is fixed at the distal end of the lead pin 14. This anode 24 is constituted by a rectangular anode fixing plate 24a made of a metal such as Ni and fixed at the distal end of the lead pin 14, and a plate-like anode (anode plate) 24b fixed on a front surface 24a B of the anode fixing plate 24a. A part of the front surface 24a B of the anode fixing plate 24a is not covered with the anode plate 24b. The anode plate 24b is made of a high melting point metal such as molybdenum or tungsten. In this specification, the high melting point metal means one of a group of materials having a melting point higher than that (1414° C.) of sillicon.

Further, the anode support member 22 consisting of a prism having an almost convex section has, at its front portion, an anode accommodation recess portion (depression) 25 for accommodating the anode fixing plate 24a, and a lead pin accommodation recess portion (depression) 26 for accommodating the distal end portion of the lead pin 14 located behind the anode 24. Therefore, when the lead pin 14 is accommodated in the lead pin accommodation recess portion 26 while fixing the anode 24 to the lead pin 14, the anode support member 22 can be held in the envelope 11 by the lead pin 14. A rear surface 24aA of the anode fixing plate 24a is in contact with and supported by a bottom surface 25a (constituting a part of a front surface K of the anode support member 22) of the anode accommodation recess portion 25.

The anode support member 22 is integrally formed of a ceramic having electrical insulating properties and a high thermal conductivity. A so-called conductive ceramic such as beryllium oxide or aluminum nitride is preferably used. Therefore, the anode support member 22 acts as a heat sink for the anode 24 to-be heated to a high temperature, thereby efficiently dissipating the heat accumulated in the light-emitting assembly 20.

Figure 4:
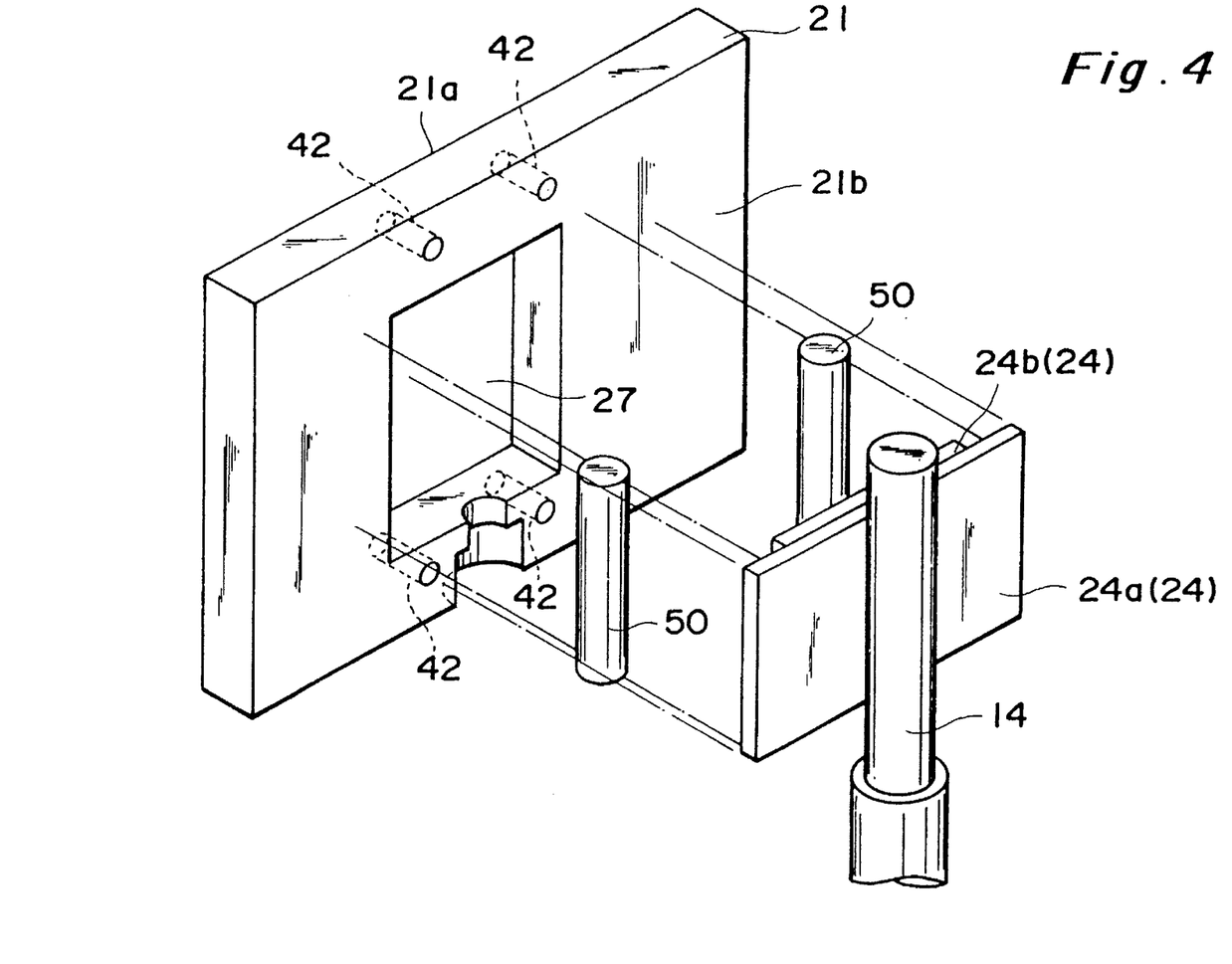
FIG. 4 is a perspective view showing an anode support member and the anode in the light-emitting assembly shown in FIG. 2.

As shown in FIGS. 2, 4, and 5, the plate-like focusing electrode support member 21 arranged in front of the anode 24 has a rectangular opening portion (through hole) 27 at a position facing the anode plate 24b. A focusing electrode fixing plate 28 made of a metal is arranged to contact the focusing electrode support member 21. A focusing electrode 29 made of a metal is fixed to a front surface 28a of the focusing electrode fixing plate 28. The focusing electrode fixing plate 28 is fixed to a front surface 21a of the focusing electrode support member 21. A focusing opening 29a of the focusing electrode 29 is arranged in the opening portion (through hole) 27 of the focusing electrode support member 21 and opposes the anode plate 24b. In this case, the focusing electrode 29 can be fixed to the focusing electrode support member 21 through the focusing electrode fixing plate 28 by welding.

Further, two columnar spacers 50 made of a ceramic are arranged between the focusing electrode support member 21 and the anode 24 and are each in contact with both the rear surface 21b of the focusing electrode support member 21 and a front surface 24aB of the anode fixing plate 24a.

Therefore, as shown in FIG. 5, the interval between the focusing electrode 29 and the anode 24 is defined by the focusing electrode support member 21 and the spacers 50. Specifically, the above interval is defined by a surface 50a of the spacer 50, the rear surface 21b of the focusing electrode support member 21 and an inner wall surface 21c of the focusing electrode support member 21, the inner wall surface 21c defining the through hole 27.

Figure 6:
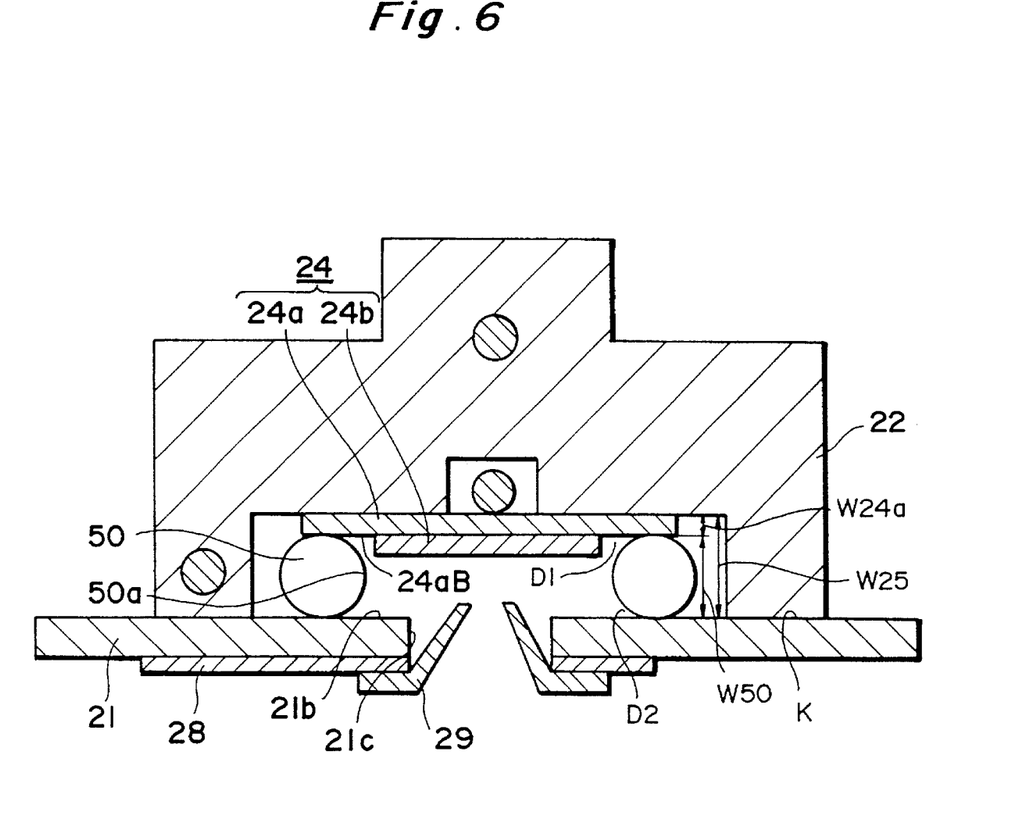
FIG. 6 is a partial sectional view for explaining a structure of the anode accommodation recess portion in the light-emitting assembly shown in FIG. 5.

As shown in FIG. 6, since the spacers 50 have a columnar shape and the anode plate 24b is not in contact with the spacers 50, spaces (depressions) D1 each defined by the surface 50a of the spacer 50, the front surface 24aB of the anode fixing plate 24a and the surface of the anode plate 24b are formed. Further, spaces (depressions) D2 each defined by the surface 50a of the spacer 50 and the rear surface 21b of the focusing electrode support member 21 are also formed.

The anode accommodation recess portion 25 of the anode support member 22, as shown in FIG. 6, has a depth W25 matching a sum of a diameter W50 of the spacer 50 and a thickness W24a of the anode fixing plate 24a, thereby an edge of the front surface K of the anode support member 22 is in directly contact with the rear surface 21b of the focusing electrode support member 21.

As shown in FIGS. 2 and 5, the front cover 23 has an almost U-shaped section and is fixed to the front surface 21a of the focusing electrode support member 21. A window 30 for passing through light caused by discharge is formed around the center portion of the front cover 23 so that the window 30 opposes to the focusing opening 29a and the anode plate 24b. A spiral hot cathode (filament) 31 for generating thermoelectrons is arranged in a space S formed between the front cover 23 and the focusing electrode support member 21. The hot cathode 31 is arranged outside the optical path of the ultraviolet light to-be emitted, i.e., on one side in the front cover 23. The hot cathode 31 has electrode rods 31a and 31b at its two ends.

A discharge straightening plate 32 made of a metal (Ni or SUS) or a ceramic is arranged outside the optical path of the ultraviolet light to-be emitted and between the hot cathode 31 and the focusing electrode 29. One end of the discharge straightening plate 32 is fixed to the front surface 21a of the focusing electrode support member 21 while the other end is in contact with an inner wall 23a of the front cover 23. The discharge straightening plate 32 also has a slit 32a for causing the hot cathode 31 to communicate with the focusing electrode 29. Thermoelectrons generated from the hot cathode 31 are passed through the slit 32a thereby to be straightened.

Assembling of the light-emitting assembly 20 will be described below.

In a case where the front cover 23 and the discharge straightening plate 32 are made of a metal, as shown in FIG. 2, a pair of left and right flange portions 23b are integrally formed at the two ends of the metal front cover 23. The flange portions 23b are brought into contact with the front surface 21a of the focusing electrode support member 21 and thereafter fixed to the focusing electrode support member 21 by welding. Further, a projecting piece 32b is integrally formed at one end of the metal discharge straightening plate 32. The projecting piece 32b is brought into contact with the front surface 21a of the focusing electrode support member 21 inside the flange portions 23b and fixed to the focusing electrode support member 21 by welding.

On the other hand, in a case where the front cover 23 and the discharge straightening plate 32 are made of a ceramic, the front cover 23 and the discharge straightening plate 32 are fixed to the focusing electrode support member 21 by using rivets or the like. Although not illustrated, a bendable pawl piece is formed on the focusing electrode support member 21, and pawl through holes for receiving the pawl piece are formed in the front cover 23 and the discharge straightening plate 32. When the pawl piece of the focusing electrode support member 21 is inserted into the pawl through holes of the front cover 23 and the discharge straightening plate 32 and bent, the front cover 23 and the discharge straightening plate 32 can be fixed to the focusing electrode support member 21.

As shown in FIGS. 2 to 4, rivet through holes 41, 42 and 43 are formed in the focusing electrode fixing plate 28, the focusing electrode support member 21 and the anode support member 22, respectively. The rivet through holes 41 to 43 extend in a direction of assembling to be coaxially arranged. Therefore, when the rivet through holes 41 to 43 are positioned, rivets 44 are then inserted into the rivet through holes 41 to 43, and the end portions of the rivets 44 are caulked, the focusing electrode fixing plate 28, the focusing electrode support member 21 and the anode support member 22 are integrally assembled, as shown in FIG. 5.

A vertical through hole 46 for receiving the lead pin 13 is formed in the anode support member 22 at its rear portion. The distal end of the lead pin 13 inserted in this vertical through hole 46 is welded to a tongue piece 47 integrally formed at the head portion of the focusing electrode fixing plate 28 (shown in FIG. 1). A vertical through hole 48a for receiving an L-shaped electrode rod 48 is formed in the anode support member 22 at its side portion. To fix the hot cathode 31 in the space S, the electrode rod 48 is inserted into the vertical through hole 48a, and thereafter, the lower end of the electrode rod 48 is welded to the distal end of the lead pin 15. Additionally, the electrode rod 31b of the hot cathode 31 is welded to the distal end of the electrode rod 48 while the electrode rod 31a of the hot cathode 31 is welded to the distal end of the lead pin 16.

As shown in FIGS. 4, 5 and 6, two columnar spacers 50 made of a ceramic are arranged between the focusing electrode support member 21 and the anode fixing plate 24a of the anode 24. The spacers 50 are each in contact with the rear surface 21b of the focusing electrode support member 23 and the front surface 24aB of the anode fixing plate 24a on both sides in the anode accommodation recess portion 25. When the focusing electrode support member 21 and the anode support member 22 are assembled through the rivets 44, the rear surface 24aA of the anode fixing plate 24a of the anode 24 is pressed against and fixed to, by the pressing force given thereto through the spacers 50, the bottom surface 25a of the anode accommodation recess portion 25 constituting a part of the front surface K of the anode support member 22. Therefore, a predetermined interval between the focusing electrode 29 and the anode 24 can always maintained constant by the spacers 50 and the focusing electrode support member 21.

Figure 7:
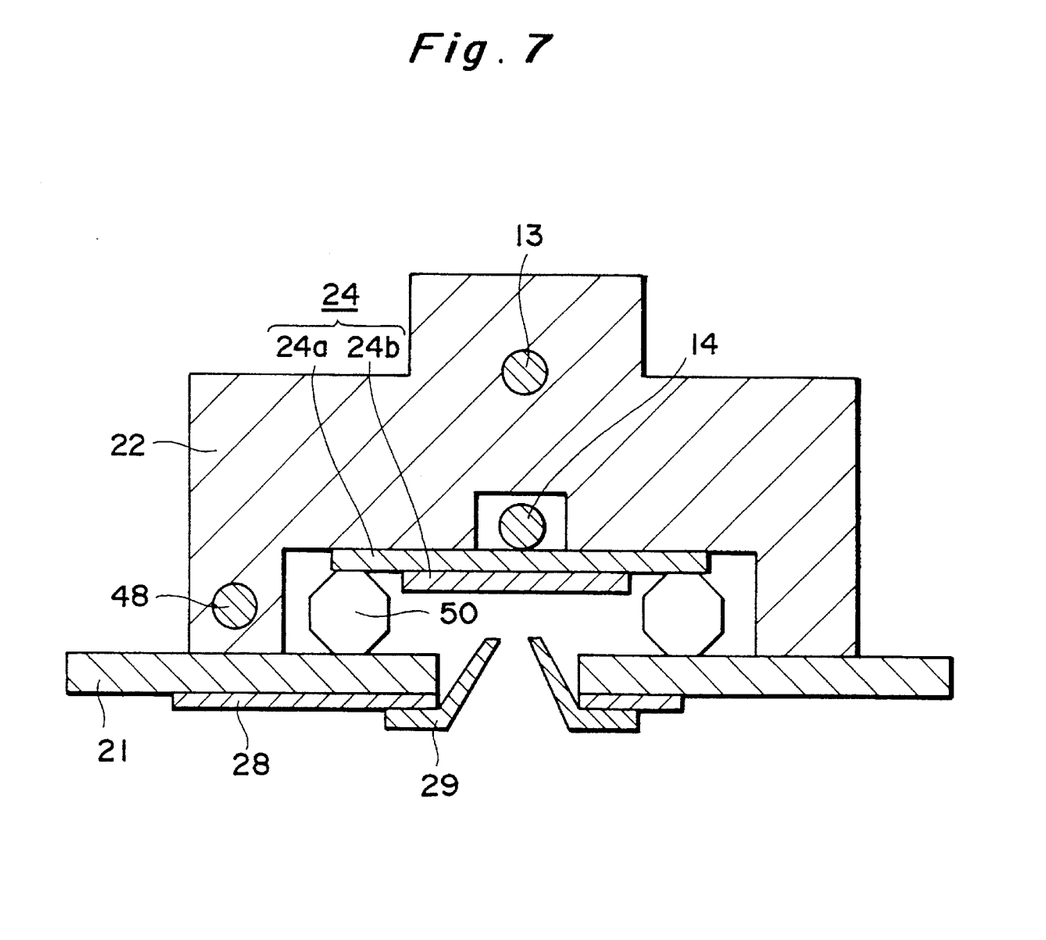
FIG. 7 is a partial sectional view of another embodiment of the light-emitting assembly according to the present invention.

Although columnar spacers are used in the embodiment mentioned above, spacers having a spherical, prismatic, or block-like shape may be used as spacers 50. FIG. 7 shows another embodiment using therein octagonal prismatic spacers 50.

Next, the operation of the above-described side-on type deuterium discharge tube 10 will be described below.

A power of about 10 W is supplied from the external power supply (not shown) to the hot cathode 31 about 20 seconds before discharge to preheat the hot cathode 31. Thereafter, a DC open-circuit voltage of about 150 V is applied between the hot cathode 31 and the anode 24, thereby preparing for arc discharge.

Upon completion of the above preparation, a trigger voltage of about 350 to 500 V is applied between the hot cathode 31 and the anode 24. Under this condition, thermoelectrons emitted from the hot cathode 31 pass through the elongated slit 32a of the discharge straightening plate 32 toward the anode plate 24b while being converged by the focusing opening 29a of the focusing electrode 29. Arc discharge occurs in front of the focusing opening 29a. Ultraviolet light emitted from an arc ball (high-density discharge area) generated by this arc discharge passes through the window 30 and is then projected outward through the circumferential surface of the glass envelope 11.

The anode 24 and the focusing electrode 29 are heated to a high temperature exceeding several hundreds °C. This heat is dissipated through the above-described members made of a ceramic or the like as needed. Since the anode 24 is firmly held by the anode support member 22 and the focusing electrode support member 21 through the spacers 50, and the focusing electrode 29 is firmly held by the focusing electrode support member 21, deformation of the above members hardly occurs even in a high temperature state during long-time continuous light emission. Therefore, a satisfactory positional precision between the anode 24 and the focusing electrode 29 can be maintained constant.

Further, an electrode material sputtered from the anode plate 24b by thermoelectrons during light emission of the gas discharge tube is hardly deposited into the depressions D1 as well as the depressions D2. Therefore, a short circuit between the focusing electrode 29 and the anode 24 can be fully prevented.

A gas discharge tube according to the second embodiment of the present invention will be described below. The gas discharge tube of this embodiment is a head-on type deuterium discharge tube which emits light from the head portion of the tube. Note that, in this embodiment, the front and rear sides are defined on the basis of the light emission direction.

Figure 8:
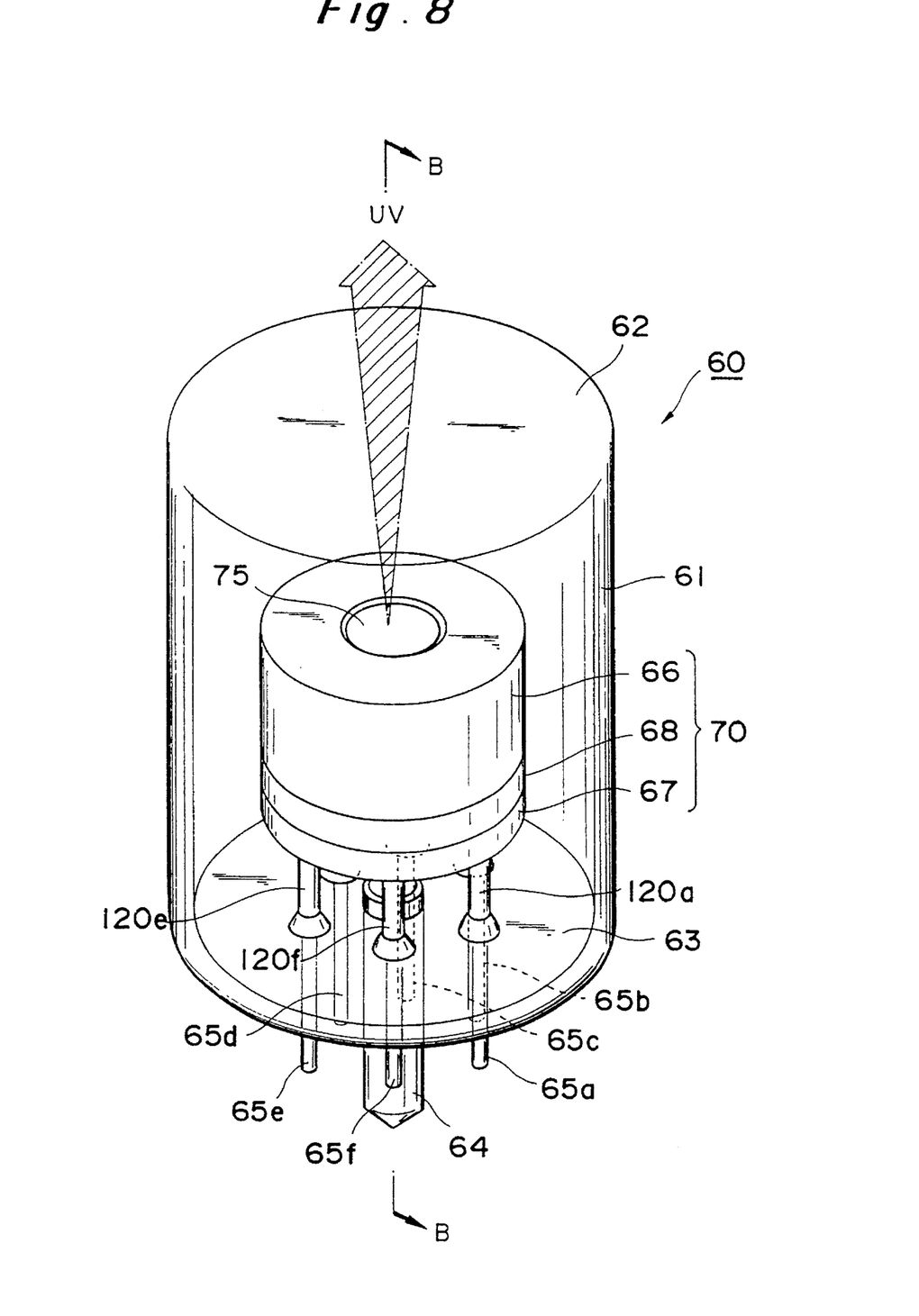
FIG. 8 is a perspective view showing an embodiment (second embodiment) of a head-on type gas discharge tube according to the present invention.

In a deuterium discharge tube 60 shown in FIG. 8, a light-emitting assembly 70 is accommodated in a cylindrical glass envelope 61. Deuterium gas (not shown) is sealed in the envelope 61 at about several Torr. The envelope 61 has a disk-like light-emitting surface 62 at the head portion and a disk-like stem 63 at the bottom portion. A tip tube 64 for exhausting/sealing a gas is provided to the stem 63. Upon completion of exhausting and then sealing of a gas in the envelope 61 through the tip tube 64, the tip tube 64 can be closed to hermetically seal the envelope 61. The envelope 61 is formed of an ultraviolet light-transmitting glass or quartz glass having a high transmissivity to ultraviolet light.

Six lead pins 65a to 65f are fixed to the stem 63. The lead pins 65a to 65f extend through the stem 63 and are connected to an external power supply (not shown) while being covered with insulating members 120a to 120f, respectively (in FIG. 8, the insulating members 120b to 120d are hidden by the light-emitting assembly 70). The light-emitting assembly 70 has a front cover 66 arranged in the front and made of a metal (Ni or SUS) or a ceramic; an anode support member 67 arranged at the rear of the front cover 66 and made of a ceramic; and a focusing electrode support member 68 fixed between the anode support member 67 and the front cover 66 and made of a metal (Ni or SUS).

The structure of the light-emitting assembly 70 will be described below in detail.

Figure 9:
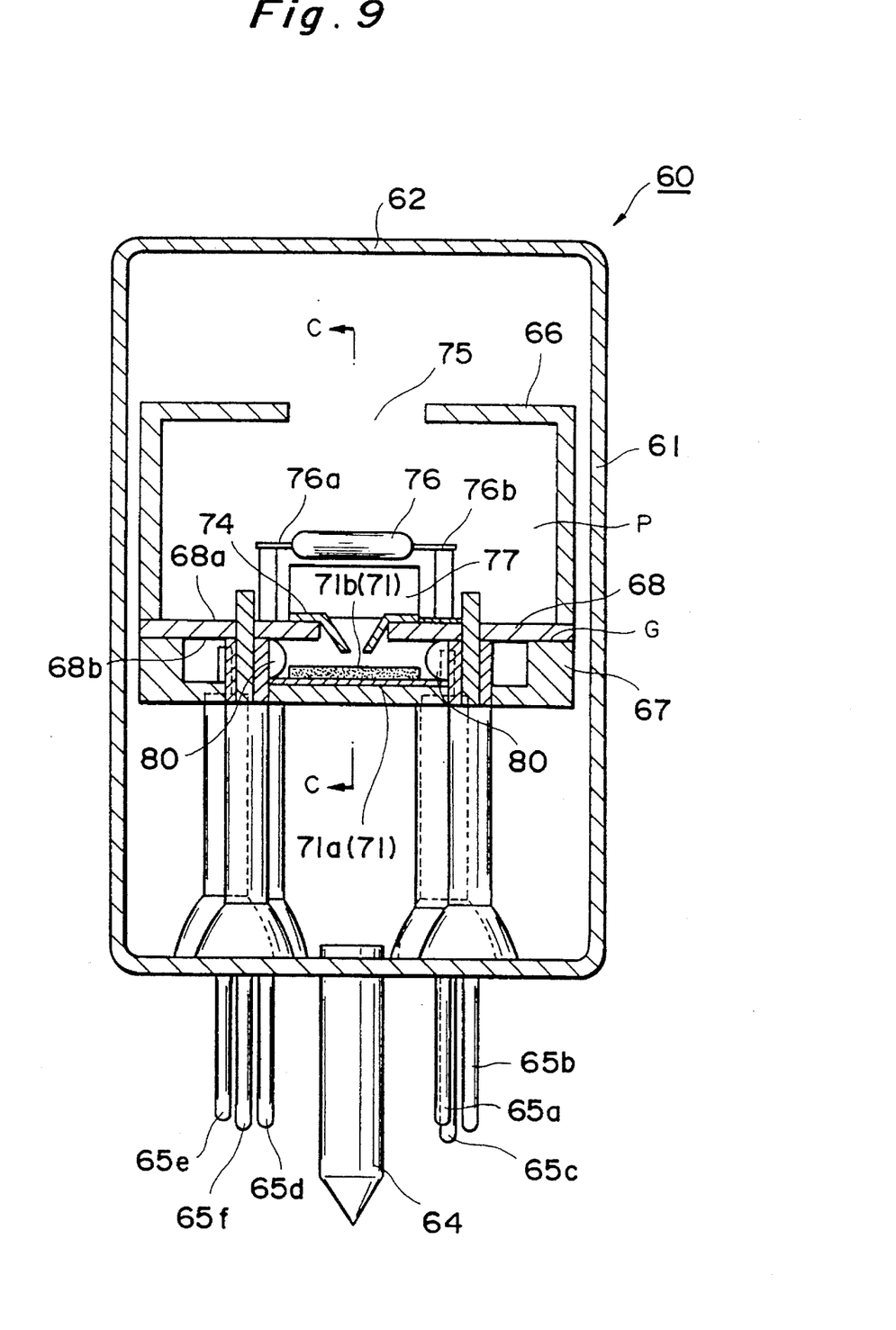
FIG. 9 is a vertical sectional view of the gas discharge tube shown in FIG. 8 (taken along a line B—B in FIG. 8 ).
Figure 10:
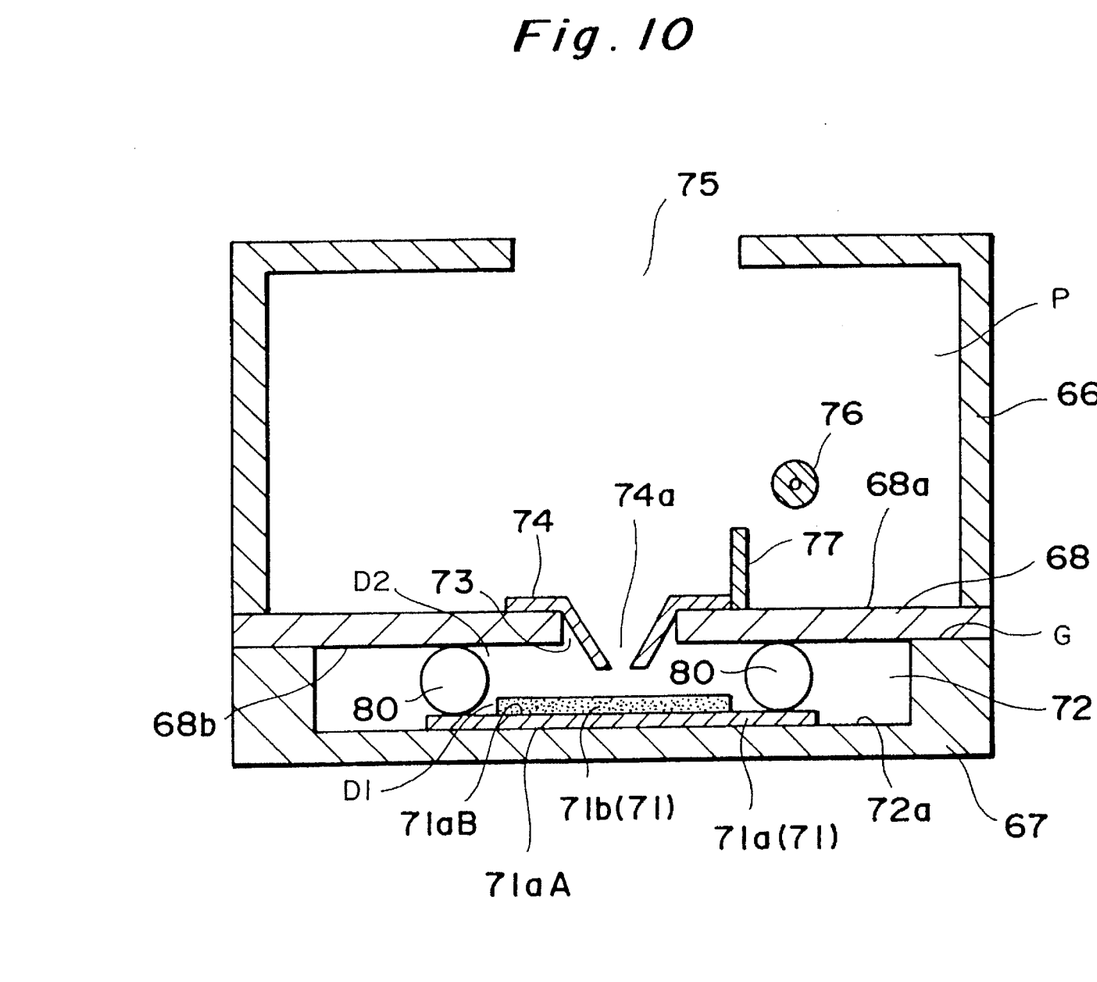
FIG. 10 is a vertical sectional view of a light-emitting assembly of the gas discharge tube shown in FIG. 8 (taken along a line C—C in FIG. 9).

As shown in FIGS. 9 and 10, an anode 71 is fixed at the distal end of the lead pin 65c extending through the anode support member 67. This anode 71 is constituted by a rectangular anode fixing plate 71a fixed at the distal end of the lead pin 65c, and a plate-like anode (anode plate) 71b fixed on a front surface 71aB of the anode fixing plate 71a. A circumferential portion of the front surface 71aB of the anode fixing plate 71a is not covered with the anode plate 71b. The anode fixing plate 71a is made of a metal such as Ni, and the anode plate 71b is made of a high melting point metal such as molybdenum or tungsten.

The cylindrical anode support member 67 having an almost concave section has, at its front portion, an anode accommodation recess portion 72 for accommodating the anode 71. Therefore, a rear surface 71aA of the anode fixing plate 71a can be brought into contact with and supported by a bottom surface 72a (constituting a part of a front surface G of the anode support member 67) of the anode accommodation recess portion 72. To arrange the anode support member 67 in the envelope 61, the anode support member 67 is fixed at the distal end of the lead pin 65f.

The plate-like focusing electrode support member 68 arranged in front of the anode 71 has a rectangular opening portion (through hole) 73 at a position opposing the anode plate 71b. A metal focusing electrode 74 is fixed to a front surface 68a of the focusing electrode support member 68. A focusing opening 74a of the focusing electrode 74 is arranged in the opening portion 73 of the focusing electrode support member 68 and opposes the anode plate 71b. In addition, the focusing electrode 74 is welded to the distal end of the lead pin 65a extending through the anode support member 67 and the focusing electrode support member 68. To arrange the focusing electrode support member 68 in the envelope 61, the focusing electrode support member 68 is fixed at the distal end of the lead pin 65e.

The front cover 66 has a cup-like section and is fixed to the front surface 68a of the focusing electrode support member 68 by rivets or pawl pieces (not shown). A window 75 for passing through light caused by discharge is formed around the center portion of the front cover 66 so that the window 75 opposes to the focusing opening 74a and the anode plate 71b. A hot cathode 76 for generating thermoelectrons is arranged in a space P formed between the front cover 66 and the focusing electrode support member 68. The hot cathode 76 is arranged outside the optical path of the ultraviolet light to-be emitted, i.e., on one side in the front cover 66. The hot cathode 76 has electrode rods 76a and 76b at its two ends. The electrode rods 76a and 76b are respectively welded to the distal ends of the lead pins 65b and 65d extending through the anode support member 67 and the focusing electrode support member 68.

A discharge straightening plate 77 made of a metal (Ni or SUS) or a ceramic is arranged outside the optical path of the ultraviolet light to-be emitted, and between the hot cathode 76 and the focusing electrode 74. The discharge straightening plate 77 stands on the front surface 68a of the focusing electrode support member 68 while contacting the focusing electrode 74.

Four spherical spacer 80 made of a ceramic are arranged between the focusing electrode support member 68 and the anode fixing plate 71a of the anode 71. The spacers 80 are each in contact with both a rear surface 68b of the focusing electrode support member 68 and the front surface 71aB of the anode fixing plate 71a, around the focusing opening 74a in the anode accommodation recess portion 72. When the focusing electrode support member 68 and the anode support member 67 are assembled and fixed, the rear surface 71aA of the anode fixing plate 71a is pressed against and fixed to, by the pressing force given thereto through the spacers 80, the bottom surface 72a of the anode accommodation recess portion 72 constituting a part of the front surface G of the anode support member 67. Therefore, a predetermined interval between the focusing electrode 74 and the anode 71 can always be maintained constant by the spacers 80 and the focusing electrode support member 68. Note that the spacers 80 may also have a columnar, prismatic or block-like shape.

Next, the operation of the above-described head-on type deuterium discharge tube 60 will be described below.

A power of about 10 W is supplied from the external power supply (not shown) to the hot cathode 76 about 20 seconds before discharge to preheat the hot cathode 76. Thereafter, a DC open-circuit voltage of about 150 V is applied between the hot cathode 76 and the anode 71, thereby preparing for arc discharge.

Upon completion of the above preparation, a trigger voltage of about 350 to 500 V is applied between the hot cathode 76 and the anode 71. Under this condition, thermoelectrons emitted from the hot cathode 76 are straightened by the discharge straightening plate 77 toward the anode plate 71b while being converged through the focusing opening 74a of the focusing electrode 74. Arc discharge occurs in front of the focusing opening 74a. Ultraviolet light emitted from an arc ball generated by this arc discharge passes through the window 75 and is then projected outward through the light-emitting surface 62 of the glass envelope 61.

The anode 71 and the focusing electrode 74 are heated to a high temperature exceeding several hundreds °C. This heat is dissipated through the above-described members formed of a ceramic or the like as needed. Since the anode 71 is firmly held by the anode support member 67 and the focusing electrode support member 68 through the spacers 80, and the focusing electrode 74 is firmly held by the focusing electrode support member 68, deformation of the above members hardly occurs even in a high temperature state during long-time continuous light emission. Therefore, a satisfactory positional precision between the anode 71 and the focusing electrode 74 can be maintained constant.

Further, an electrode material sputtered from the anode plate 71b by thermoelectrons during light emission of the gas discharge tube is hardly deposited into the depressions D1 each defined by the surface of the spacer 80, the front surface 71aB of the anode fixing plate 71a and the surface of the anode plate 71b, as well as the depressions D2 each defined by the surface of the spacer 80 and the rear surface 68b of the focusing electrode support member 68. Therefore, a short circuit between the focusing electrode 74 and the anode 71 can be fully prevented.

The gas discharge tube of the present invention is not limited to the above embodiments, and various changes and modifications can also be made.

As has been described above in detail, in the gas discharge tube according to the present invention, the spacer is brought into contact with both the rear surface of the focusing electrode support member and the front surface of the anode to press the anode against the front surface of the anode support member, thereby holding constant the interval between the focusing electrode and the anode through the spacer and the focusing electrode support member. With this arrangement, the anode is firmly held by the spacer and the anode support member. Deformation of the above members hardly occurs even in high temperature state during long-time continuous light emission, and satisfactory positional precision between the anode and the focusing electrode can be maintained constant thereby to prevent deformation of the path of the thermoelectrons between the focusing electrode and the anode. Thus the arc discharge state can be held stable, and the stability of light emission of the discharge tube will not be impaired. Therefore, the operational stability of the gas discharge tube can be improved, and the service life thereof can also be prolonged.

In addition, in the gas discharge tube of the present invention, since the anode support member and the spacer are made of an insulator such as a ceramic, the electrical insulating effect between the focusing electrode and the anode, as well as the heat dissipation effect from the anode and the focusing electrode, can be promoted.

Further, in the gas discharge tube of the present invention, a portion such as a depression on which the sputtered electrode material hardly deposits can be easily formed in the space formed between the focusing electrode support member and the anode support member, by means of appropriate selection of the shape and the position of the spacer to-be used. For this reason, a short circuit between the focusing electrode and the anode can be easily and fully prevented by only selection of the shape and the position of the spacer to-be used.

Therefore, a gas discharge tube having a long service life and capable of improving the operational stability during long-time continuous light emission can be easy provided.

From the invention thus described, it will be obvious that the inventions may be varied in many ways. Such variations are not to be regarded as a departure from the spirit and scope of the invention, and all such modifications as would be obvious to one skilled in the art are intended to be included within the scope of the following claims.

What is claimed is:

1. A gas discharge tube comprising:

a focusing electrode support member of a conductive material, said focusing electrode support member having a front surface and a rear surface which is opposite to said front surface and which is communicated with the front surface by a through hole;

a hot cathode for emitting thermoelectrons, said hot cathode being located at the front surface side of said focusing electrode support member;

an anode for receiving the thermoelectrons emitted from said hot cathode, said anode being located at the rear surface side of said focusing electrode support member and facing an opening of the through hole;

a focusing electrode being supported by said focusing electrode support member, said focusing electrode having a focusing opening which is located at a position of an opening of the through hole for converging paths of the thermoelectrons;

a spacer of an insulator, said spacer being arranged between said focusing electrode support member and said anode, and being in contact with both the rear surface of said focusing electrode support member and a front surface of said anode; and an anode support member of an insulator, said anode support member being located on an opposite side to said focusing electrode support member through said anode, and having a surface which is in contact with a rear surface of said anode for pushing said anode onto the rear surface of said focusing electrode support member through said spacer, wherein an interval between said focusing electrode and said anode is defined by said focusing electrode support member and said spacer.

2. A gas discharge tube according to claim 1, wherein said interval between said focusing electrode and said anode is defined by a surface of said spacer, the rear surface of said focusing electrode support member and an inner wall surface of said focusing electrode support member, said inner wall surface defining said through hole.

3. A gas discharge tube according to claim 1, wherein said anode support member and said spacer are made of a ceramic.

4. A gas discharge tube according to claim 1, wherein said focusing electrode support member and said focusing electrode are made of a metal.

5. A gas discharge tube according to claim 1, wherein said anode comprises:

an anode fixing plate of a conductive material, said anode fixing plate having a front surface being in contact with said spacer, and a rear surface being in contact with said anode support member; and an anode plate for receiving the thermoelectrons, said anode plate being made of a high melting point metal, and being fixed on the front surface of said anode fixing plate.

6. A gas discharge tube according to claim 5, wherein a part of the front surface of said anode fixing plate is not covered with said anode plate for being in contact with said spacer, and said anode plate is not in contact with said spacer to form a space defined by a surface of said spacer, a front surface of said anode fixing plate and a surface of said anode plate.

7. A gas discharge tube according to claim 1, wherein said spacer has a shape which enables to form a depression defined by a surface of said spacer and the rear surface of said focusing electrode support member and a depression defined by the surface of said spacer and the front surface of said anode.

8. A gas discharge tube according to claim 1, wherein said spacer has a shape selected from the group of a columnar shape, a prismatic shape, a spherical shape and a block-like shape.

9. A gas discharge tube according to claim 1, wherein said anode support member further has a depression at it's surface which faces to said focusing electrode support member, for accommodating said anode and said spacer, said depression extending from the surface of said anode support member to a vertical direction with respect to the rear surface of said focusing electrode support member.

10. A gas discharge tube according to claim 1, further comprising a discharge straightening plate for discharge shielding, said discharge straightening plate being positioned and mounted on the front surface of said focusing electrode support member, and having a slit for passing through thermoelectrons emitted from said hot cathode.

11. A gas discharge tube according to claim 1, further comprising a front cover for discharge shielding, said front cover being positioned and mounted on the front surface of said focusing electrode support member so as to accommodate said hot cathode and said discharge straightening plate in a space defined by said front cover and said focusing electrode support member, said front cover having a window located at a position which faces to the focusing opening of said focusing electrode, for outputting light caused by discharge.

12. A gas discharge tube comprising:

an envelope for sealing a gas therein;

lead pins introduced into an inner space of said envelope from external of said envelope; and a light-emitting assembly positioned at distal ends of said lead pins and supported by said lead pins while spaced from an inner side wall of said envelope, said light-emitting assembly including:

a focusing electrode support member of a conductive material, said focusing electrode support member having a front surface and a rear surface which is opposite to said front surface and which is communicated with the front surface by a through hole;

a hot cathode for emitting thermoelectrons, said hot cathode being located at the front surface side of said focusing electrode support member, and being connected to and supported by at least one of said lead pins;

an anode for receiving the thermoelectrons emitted from said hot cathode, said anode being located at the rear surface side of said focusing electrode support member, facing an opening of the through hole, and being connected to and supported by another one of said lead pins;

a focusing electrode being supported by said focusing electrode support member, said focusing electrode having a focusing opening which is located at a position of an opening of the through hole for converging paths of the the thermoelectrons, and being connected to and supported by still another one of said lead pins;

a spacer of an insulator, said spacer being arranged between said focusing electrode support member and said anode, and being in contact with both the rear surface of said focusing electrode support member and a front surface of said anode; and an anode support member of an insulator, said anode support member being located on an opposite side to said focusing electrode support member through said anode, and having a surface which is in contact with a rear surface of said anode for pushing said anode onto the rear surface of said focusing electrode support member through said spacer, wherein an interval between said focusing electrode and said anode is defined by said focusing electrode support member and said spacer.

13. A gas discharge tube according to claim 12, wherein said interval between said focusing electrode and said anode is defined by a surface of said spacer, the rear surface of said focusing electrode support member and an inner wall surface of said focusing electrode support member, said inner wall surface defining said through hole.

14. A gas discharge tube according to claim 12, wherein said anode support member and said spacer are made of a ceramic.

15. A gas discharge tube according to claim 12, wherein said focusing electrode support member and said focusing electrode are made of a metal.

16. A gas discharge tube according to claim 12, wherein said anode comprises:

an anode fixing plate of a conductive material, said anode fixing plate having a front surface being in contact with said spacer, and a rear surface being in contact with said anode support member; and an anode plate for receiving the thermoelectrons, said anode plate being made of a high melting point metal, and being fixed on the front surface of said anode fixing plate.

17. A gas discharge tube according to claim 16, wherein a part of the front surface of said anode fixing plate is not covered with said anode plate for being in contact with said spacer, and said anode plate is not in contact with said spacer to form a space defined by a surface of said spacer, a front surface of said anode fixing plate and a surface of said anode plate.

18. A gas discharge tube according to claim 12, wherein said spacer has a shape which enables to form a depression defined by a surface of said spacer and the rear surface of said focusing electrode support member and a depression defined by the surface of said spacer and the front surface of said anode.

19. A gas discharge tube according to claim 12, wherein said spacer has a shape selected from the group of a columnar shape, a prismatic shape, a spherical shape and a block-like shape.

20. A gas discharge tube according to claim 12, wherein said anode support member further has a depression at it's surface which faces to said focusing electrode support member, for accommodating said anode and said spacer, said depression extending from the surface of said anode support member to a vertical direction with respect to the rear surface of said focusing electrode support member.

21. A gas discharge tube according to claim 12, further comprising a discharge straightening plate for discharge shielding, said discharge straightening plate being positioned and mounted on the front surface of said focusing electrode support member, and having a slit for passing through thermoelectrons emitted from said hot cathode.

22. A gas discharge tube according to claim 12, further comprising a front cover for discharge shielding, said front cover being positioned and mounted on the front surface of said focusing electrode support member so as to accommodate said hot cathode and said discharge straightening plate in a space defined by said front cover and said focusing electrode support member, said front cover having a window located at a position which faces to the focusing opening of said focusing electrode, for outputting light caused by discharge.

* * * * *